UNITED STATES PATENT OFFICE.

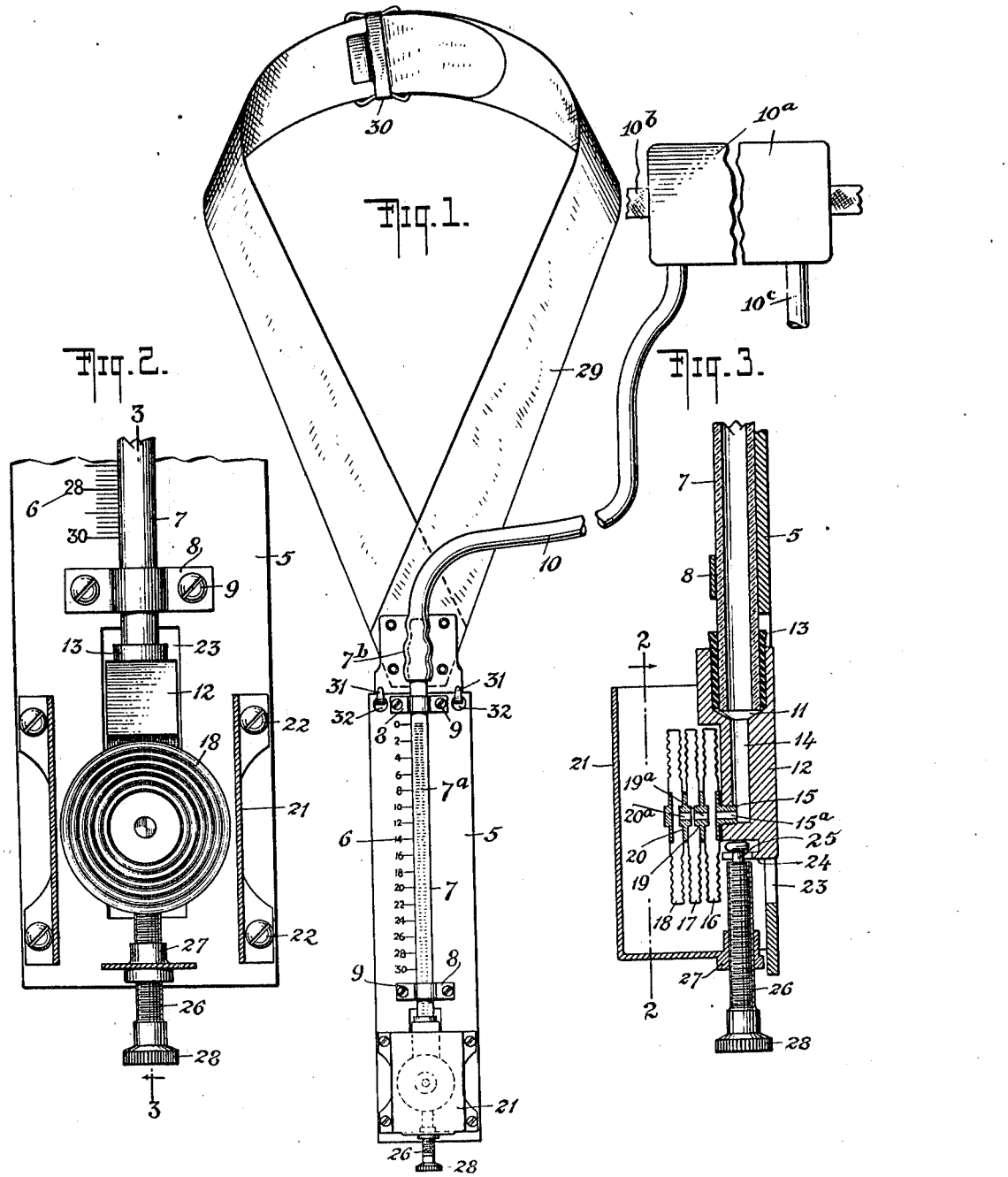

RALPH F. SCHNEIDER, OF NEW YORK, N. Y., ASSIGNOR TO CHARLES J. TAGLIABUE, OF BROOKLYN, NEW YORK.

MEASURING INSTRUMENT.

1,096,958. Specification of Letters Patent. Patented May 19, 1914.

Application filed October 17, 1913. Serial No. 795,619.

*To all whom it may concern:*

Be it known that I, RALPH F. SCHNEIDER, a citizen of the United States, and a resident of the borough of the Bronx, city, county, and State of New York, have invented certain new and useful Improvements in Measuring Instruments, of which the following is a specification.

My invention relates to measuring instruments and more particularly to that type of such instruments commonly known as sphygmomanometers or pulsometers and adapted to indicate on a scale the pressure of the blood in the arteries of a human being or animal as well as the pulsations of said arteries.

My improvement has for its object to provide an instrument of this type which is extremely simple in construction and operation, which is light and easily portable and in which a column of water or other indicating liquid having a low co-efficient of expansion under temperature changes is used in combination with a scale as an indicating means.

Other objects of my invention will appear from the description hereinafter and the features of novelty will be pointed out in the appended claims.

Reference is to be had to the accompanying drawings which illustrate an example of my improvement and in which—

Figure 1 is a front elevation of my improved instrument; Fig. 2 is an enlarged detail front view partly in section on the line 2—2 of Fig. 3 and Fig. 3 is a sectional view on the line 3—3 of Fig. 2.

In the drawings, 5 is a scale plate upon which a scale 6 is produced in any suitable manner, said scale reading from the top downwardly and being located adjacent to a tube 7 which extends lengthwise of the plate 5 as clearly shown in Fig. 1 and contains a column 7ª of water or other indicating liquid having a low co-efficient of expansion under temperature changes. The tube 7 is combined with the scale plate 5 in any suitable manner, as by means of clamps 8 in which said tube 7 is preferably axially slidable for adjustment purposes as will be more fully described hereinafter, said clamps 8 being secured upon the plate 5 by screws or other fastening devices 9. The one end of the tube 7 is preferably shaped to form a nipple 7ᵇ with which the one end of a tube 10 is adapted to be connected, the said tube 10 communicating for instance with any type of inflatable bag or the like as indicated at 10ª, said bag being adapted for connection with the person or animal under observation in any customary manner, as, for instance, by straps 10ᵇ and being also connected by means of a tube 10ᶜ with a bulb or other air injecting device in the customary manner. The opposite end of the tube 7 as shown is detachably secured in a recess 11 formed in a member 12 and is surrounded by a rubber or other packing sleeve 13 which is thus located between the end of the tube 7 and the wall of the recess and serves to secure a fluid and air tight connection at this point and also to protect said tube end against injury by direct contact with the member 12. The member 12 is further provided with a channel 14 which communicates at one end with the recess 11 and thus with the tube 7 and at the other end connects with a transverse opening in which a flanged plug 15 is removably positioned as by screw-threading, this plug 15 serving to secure a diaphragm chamber 16 upon the member 12 and being provided with an axial passage 15ª for establishing communication between the interior of the diaphragm chamber 16 and the channel 14. Two additional diaphragm chambers 17 and 18 are secured to the diaphragm chamber 16 and to each other respectively by means of plugs 19 and 20 provided with axial passages 19ª and 20ª whereby communication between the diaphragm chambers is brought about, the outside chamber 20 being otherwise closed or sealed. These diaphragm chambers 16, 17 and 18 are preferably made of material of different thickness to secure different degrees of resiliency therein, the arrangement illustrated showing the chambers 16 and 18 for instance made of material having a thickness of 1½ thousandths of an inch, while the chamber 17 is made of material of 3/1000 of an inch thickness. It is to be understood that this arrangement may be changed to meet the requirement of different conditions and that the number of chambers may be increased or diminished if found desirable. The diaphragm chambers 16, 17 and 18 are preferably located in a protecting casing 21 which is open at the top and is removably secured upon the scale plate 5 in any suitable manner as by means of screws 22. The member 12 as shown is mounted in an opening 23 formed in the scale plate 5 and is provided with a forked lug or projection 24 which straddles the reduced neck 25 of an adjusting screw 26 whereby the latter is rotatable relatively to said member 12 and moves therewith in a direction lengthwise of the scale plate 5. This adjusting screw 26 is in screw-threaded engagement with a boss 27 forming part of the casing 21 and is provided with an operating head 28 whereby said screw 26 may be rotated to adjust the position of the member 12 and with it the tube 7 which latter is thus moved relatively to the scale 6 for the purpose to be more fully described hereinafter.

In order that my improved instrument may readily be supported in a position in which it may be quickly and easily consulted or read I may for instance suspend the same upon the person or animal under observation by means of a strap 29, adjustable as to length by means of a buckle or clamp 30 and having hooks 31 adapted to be inserted into apertures 32 of the scale plate 5 as clearly shown in Fig. 1. The apertures 32 are preferably spaced from each other and located on opposite sides of the vertical center line of the plate 5 and the hooks 31 are correspondingly located on the strap 29 whereby the instrument is suspended in a vertical position and held against any transverse swinging movement relatively to the strap. It will of course be apparent that the strap 29 may be used to suspend the instrument otherwise than as described.

In using the instrument the customary flexible bag or the like 10ª is attached by means of the attaching device 10ᵇ to the body under examination, for instance upon the arm of a human being and then inflated through the tube 10ᶜ by means of a bulb or other air injecting device, it being understood that the bag is so secured in position by the attaching device 10ᵇ that the pressure of the bag as it is inflated will be directed toward the arm of the patient. The inflation of the bag is continued until the pressure thereof upon the arm is sufficient to render the pulse of said patient imperceptible. During the inflation of the bag as described the introduced air will also exert a pressure upon the upper end of the water or other indicating liquid column 7ª in the tube 7, owing to its connection with the tube 10 and will in consequence depress said column 7ª in the tube 7 so that the degree of pressure exerted to render said pulse imperceptible is registered by the column 7ª in combination with the scale 6. The water or other indicating liquid column 7ª will move downwardly in the tube 7 substantially as a unit under the influence of such pressure and will in consequence cause the diaphragm chambers 16, 17 and 18 to be expanded against their normal tension to allow for the displacing of the column 7ª in the tube 7. When the pulse has been rendered imperceptible as described, air is permitted to escape from the bag until the pulse again becomes apparent at which point the escape of air is shut off in any desired manner. During this latter operation the resiliency of the diaphragm chambers or their tendency to return to normal position will cause the water or other indicating liquid column 7ª to move up again into the tube 7 so that the degree of pressure exerted at the time the pulse again becomes apparent may also be read on the scale 6. The degree of pressure at which the pulsation appears and disappears is thus readily obtained and may be accurately recorded by the observer for any desired purpose.

After the last named condition has been reached each pulsation of the arteries will act upon the air in the bag and will be communicated through the tube 10 to the tube 7 and will in consequence act upon the water or other indicating liquid column 7ª. If the fluctuations of the pulse are irregular the movement of the water or other indicating liquid column 7ª will correspond while if the pulsations are regular the successive movements of said water column 7ª will be regular and even and the extent or strength of each pulsation in either case will be accurately indicated upon the scale 6.

My improved instrument permits the use of diaphragm chambers which is a desirable feature in instruments of this type and is made possible in the present case through the use of a column of water or the like, instead of mercury or the like, the latter being of much greater specific gravity than water or the like and being incapable of accurate use in connection with diaphragms owing to the fact that the weight of said mercury column on the diaphragms would be too great to secure a stable result. In addition to this it is much easier in some instances to secure a supply of water than mercury in case the column needs replenishment, so that the present instrument is capable of a much more extended use than if mercury were employed in the tube 7. By exerting the pressure of the air upon the top of the column 7ª the said pressure does not first have to overcome the slight weight of said column as would be the case if the tube 10 were connected with the lower end of the tube 7 and said pressure thus immediately becomes effective to displace said column 7ª in the tube 7.

The column 7ª may at all times be adjusted so that its upper end normally and accurately registers with the zero on the scale 6 by simply actuating the screw 26.

Such actuation will move the member 12 lengthwise of the opening 23 and with it the tube 7 up or down on the scale plate 5, this depending upon the direction in which said screw is operated and will consequently move the water column 7ª relatively to the scale 6 as will be clearly apparent. The screw 26 during these operations is displaced in the boss 27 owing to its screw-threaded engagement therewith. It is thus possible to accurately adjust the instrument to compensate for changes in the water column 7ª due to evaporation or any other cause.
My improved instrument is very sensitive and accurate in operation, is simple in construction, comprises few parts and may be readily and quickly taken apart and put together if for any reason this becomes necessary. In other words the tube 7 may be readily withdrawn from the recess 11, and the plug 15 removed from the member 12, as by unscrewing the plug 15 to free the diaphragm chambers 16, 17 and 18 from the said member 12, after which the latter may be easily detached from the screw 26 by a transverse movement through the opening 23 toward the right in Fig. 3. The parts comprising my improved instrument are such as not to be easily disarranged so that a maximum period of usefulness is assured and the cost of manufacture of the instrument is reduced to a minimum.

In order that the water column 7ª may be prevented from freezing too readily I may add a small percentage of alcohol thereto to lower the freezing point thereof. It is to be understood that the term "indicating liquid" as used in the specification and claims is intended to cover any fluid which has a low co-efficient of expansion under temperature changes and that the claims are to be construed accordingly.

Various changes in the specific form shown and described may be made within the scope of the claims without departing from the spirit of my invention.

I claim:

1. A pulsometer or the like comprising a scale plate, a scale thereon, a tube carried by said scale plate adjacent to said scale, an actuating means, a connection from said tube to said actuating means and a water column displaceable in said tube whereby the action of said actuating means is indicated on the scale.

2. A pulsometer or the like comprising a scale plate, a scale thereon, a tube carried by said scale plate adjacent to said scale, a pneumatic actuating means, a connection from said tube to said pneumatic actuating means, a liquid column downwardly displaceable in said tube under pressure exerted by said pneumatic means whereby the action of said means is indicated on said scale and means for permitting said downward displacement of said liquid column.

3. A pulsometer or the like comprising a scale plate, a scale thereon, a tube carried by said scale plate adjacent to said scale, a pneumatic actuating means, a connection from said tube to said pneumatic actuating means, a liquid column downwardly displaceable in said tube under pressure exerted by said pneumatic means whereby the action of said means is indicated on said scale and resilient means connected with said tube and adapted to yield as said liquid column is downwardly displaced by the pressure exerted by said pneumatic means and to return said liquid column as said pressure is removed.

4. A pulsometer or the like comprising a scale plate, a scale thereon, a tube carried by said scale plate adjacent to said scale, an actuating means, a connection from the upper end of said tube to said actuating means, a member connected with the lower end of said tube and having a channel in communication therewith, a liquid column downwardly displaceable in said tube under the influence of said actuating means whereby the action of the latter is indicated on said scale and a diaphragm chamber carried by said member in communication with the channel therein, and arranged to yield as the liquid column is displaced under the influence of said actuating means and to return said liquid column as said influence is removed.

5. A pulsometer or the like comprising a scale plate, a scale thereon, a tube slidable lengthwise of said plate adjacent to said scale, an actuating means, a connection from the upper end of said tube to said actuating means, a member connected with the lower end of said tube and having a channel in communication therewith, a liquid column downwardly displaceable in said tube under the influence of said actuating means whereby the action of the latter is indicated on said scale, a diaphragm chamber carried by said member in communication with said channel therein and arranged to yield as the liquid column is displaced under the influence of said actuating means and to return said liquid column as said influence is removed and means for moving said tube, member and diaphragm chamber as a unit lengthwise of said scale plate whereby the position of said liquid column relatively to said scale is adjusted.

6. A pulsometer or the like comprising a scale plate, a scale thereon, a tube carried by said scale plate adjacent to said scale, an actuating means, a connection from the upper end of said tube to said actuating means, a member connected with the lower end of said tube and having a channel in communication therewith, a liquid column downwardly displaceable in said tube under the influence of said actuating means whereby the action of the latter is indicated on said scale and a plurality of diaphragm chambers of varying resiliency carried by said member, said chambers communicating with each other and with the channel in said member and being adapted to yield as said liquid column is displaced under the influence of said actuating means and to return said liquid column as said influence is removed.

7. A pulsometer or the like comprising a scale plate, a scale thereon, a tube carried by said scale plate adjacent to said scale, an actuating means, a connection from the upper end of said tube to said actuating means, a member connected with the lower end of said tube and having a channel in communication therewith, a liquid column downwardly displaceable in said tube under the influence of said actuating means whereby the action of the latter is indicated on said scale, a plurality of diaphragm chambers of varying resiliency carried by said member, said chambers communicating with each other and with the channel in said member and being adapted to yield as said liquid column is displaced under the influence of said actuating means and to return said liquid column as said influence is removed, and a protecting case secured to said scale plate and extending over said diaphragm chambers.

In testimony whereof I have hereunto set my hand in the presence of two subscribing witnesses.

RALPH F. SCHNEIDER.

Witnesses:
 JOHN A. KEHLENBECK,
 PETER M. FERNANDEZ.